United States Patent
Le Saux et al.

(10) Patent No.: US 7,945,005 B2
(45) Date of Patent: May 17, 2011

(54) METHOD AND MODULE FOR ESTIMATING TRANSMISSION CHANELS OF A MULTI-ANTENNA MULTI-CARRIER SYSTEM

(75) Inventors: Benoit Le Saux, Cesson Sevigne (FR); Maryline Helard, Rennes (FR); Xenophon Doukopoulos, Montrouge (FR)

(73) Assignee: France Telecom, Paris (FR)

( * ) Notice: Subject to any disclaimer, the term of this patent is extended or adjusted under 35 U.S.C. 154(b) by 829 days.

(21) Appl. No.: 11/900,389

(22) Filed: Sep. 10, 2007

(65) Prior Publication Data

US 2008/0062859 A1  Mar. 13, 2008

(30) Foreign Application Priority Data

Sep. 8, 2006  (FR) .................................... 06 53625

(51) Int. Cl.
 *H04B 7/10* (2006.01)
(52) U.S. Cl. ........................................ 375/347; 375/349
(58) Field of Classification Search .................. 375/148, 375/144, 260, 347, 349
 See application file for complete search history.

(56) References Cited

U.S. PATENT DOCUMENTS

| 2003/0072254 | A1 | 4/2003 | Ma et al. | |
| 2006/0179390 | A1* | 8/2006 | Tirkkonen et al. | 714/748 |
| 2006/0280255 | A1* | 12/2006 | Hongming et al. | 375/260 |

OTHER PUBLICATIONS

I. Barhumi, "Optimal Training Design for MIMO OFDM Systems in Mobile Wireless Channels", IEEE Transactions on Signal Processing, vol. 51, No. 6., pp. 1615-1624, Jun. 2003.
Y. Teng et al., "Performance of DCT Interpolation-based Channel Estimation Method for MIMO-OFDM Systems", International Symposium on Communications and Information Technologies 2004, pp. 622-627, Oct. 26-29, 2004.
J. Moon et al., "Channel Estimation for MIMO-OFDM Systems Employing Spatial Multiplexing", Vehicular Technology Conference, vol. 5, pp. 3649-3654, Sep. 2004.
E.G. Larsson et al., "Preamble Design for Multiple-Antenna OFDM-Based WLANs With Null Subcarriers", IEEE Signal Processing Letters, vol. 8, No. 11, pp. 285-288, Nov. 2001.
M.S. Baek et al., "Multi-Antenna Scheme for High Capacity Transmission in the Digital Audio Broadcasting", IEEE Transactions on Broadcasting, vol. 51, No. 4, pp. 551-559, Dec. 2005.

* cited by examiner

*Primary Examiner* — Emmanuel Bayard
(74) *Attorney, Agent, or Firm* — Cohen Pontani Lieberman & Pavane LLP

(57) ABSTRACT

A method and a module for estimating transmission channels in a multi-antenna system. A matrix A is calculated which is constructed in the form of blocks from training sequences and an appropriate Fourier matrix. For a receive antenna $RX_j$ concerned, the method and the module calculate $N_t$ impulse responses in the time domain by multiplying $N_p$ pilot symbols extracted from a frequency-domain signal $R^j(n)$ obtained after demodulation of a time-domain signal received by the receive antenna $RX_j$ concerned by a product of matrices comprising the pseudo-inverse matrix of the product of the Hermitian matrix of the A matrix with the A matrix enabling decorrelation of modulated carriers adjacent null carriers.

10 Claims, 3 Drawing Sheets

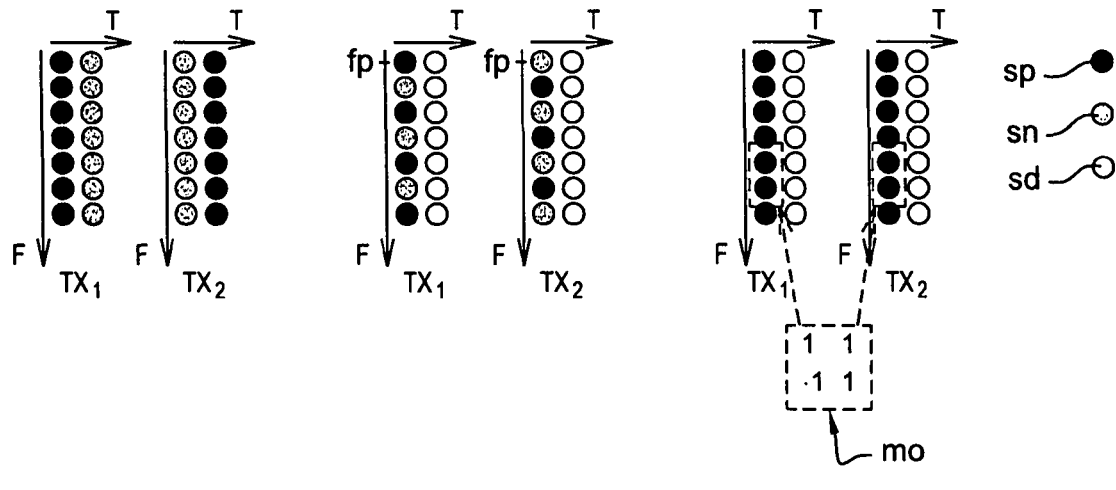
Fig. 1a
(PRIOR ART)
Fig. 1b
PRIOR ART
Fig. 1c
PRIOR ART
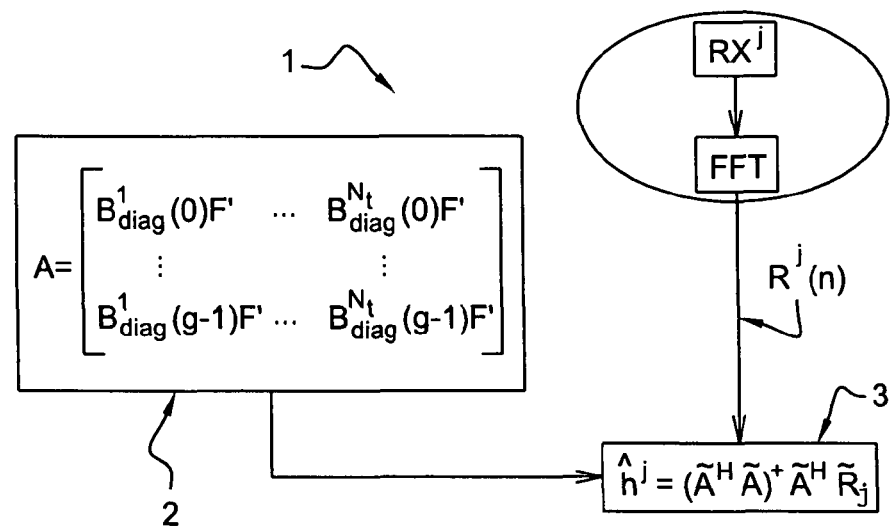
Fig. 2

METHOD AND MODULE FOR ESTIMATING TRANSMISSION CHANELS OF A MULTI-ANTENNA MULTI-CARRIER SYSTEM

FIELD OF THE INVENTION

The present invention relates to the field of telecommunications. Within that field, the invention relates more particularly to digital communications, which include wireless radio communications and cable communications. Communication is via a transmission medium usually called the transmission or propagation channel, originally with reference to a radio channel and by extension with reference to any kind of channel.

BACKGROUND OF THE INVENTION

The invention relates to sending and receiving, and in particular to estimating transmission channels in a MIMO (Multiple Input Multiple Output) or MISO (Multiple Input Single Output) multi-antenna system using multiple carriers and equalization in the frequency domain. In a system with multiple send or receive antennas, there are as many transmission channels as there are sending antenna+receive antenna pairs. Channel estimation is the process of estimating the impulse response of each channel. The invention applies to multi-antenna multi-carrier systems using at least two send antennas.

These systems employ a frame of particular length having content at the input of the sender device that includes payload data symbols, i.e. symbols that code the information of an input signal, and at the output of the same device the frame is distributed in time and in frequency when sent on multiple carriers. A time-frequency frame then determines the temporal location of payload data symbols and pilot symbols, i.e., reference symbols inserted into the time-frequency frame on transmission, on the various carriers. Furthermore, the presence of multiple send antennas enables the introduction of spatial diversity by multiplexing the payload data between the antennas. In the remainder of this document, the term data refers to payload data.

The invention can be applied to uplink communication (from a terminal to a base station) and to downlink communication (from a base station to a terminal).

One example of application of the invention is the field of fixed or mobile radio communication, especially fourth generation and later systems typically referred to a B3G (Beyond $3^{rd}$ Generation) systems. These systems include MC-CDMA (Multi-Carrier Coded Division Multiple Access) downlink or uplink systems and downlink or uplink OFDMA (Orthogonal Frequency Division Multiple Access) systems, using a MIMO (Multiple Input Multiple Output) transmission scheme, in which data to be transmitted is divided into time-frequency frames including pilot symbols and possibly null carriers. The invention applies in particular to any type of system using OFDM modulation, for example of OFDMA, LP-OFDM type, or to systems of IFDMA type.

Standard transmission methods include a modulation step. If differential modulation is not used (non-coherent system), it is essential for the receiver to estimate the propagation channel (coherent system) in order to be able to equalize the received signal and detect the bits sent. Differential modulation applied to multi-antenna systems is not at present considered to be a promising option for high-bit-rate communication systems. It doubles the noise level, which degrades performance by around 3 dB.

Thus, channel estimation is particularly important in multi-antenna systems because their performance is directly linked to channel estimation in the receiver. The various channels linking each send antenna to each receive antenna must also be estimated independently of each other. The performance of multi-antenna systems is further constrained by the presence of pilot symbols that lead to a loss of spectral efficiency.

A number of techniques for estimating transmission channels in a multi-antenna system comprising multiple send antennas are known in the art. They include techniques based on processing pilot symbols. These pilot symbols are known to the receiver and enable it to estimate the transmission channels corresponding to each send antenna. In theory, the capacity of MIMO systems increases in linear relation to the minimum number of send and receive antennas. In practice, because of the necessary presence of pilot symbols in the frame, the usable spectral efficiency is inversely proportional to the number of antennas.

Various techniques exist for inserting pilot symbols into the time-frequency frame sent by an antenna. All the pilot symbols for the same time-frequency frame form a training sequence.

A first technique, illustrated by FIG. 1a, described in the paper by Y. Teng, K. Mori and H. Kobayashi "Performance of DCT Interpolation-based Channel Estimation Method of MIMO-OFDM Systems", ISCIT, October 2004, inserts an OFDM pilot symbol successively in time at each send antenna and sets to zero the OFDM symbols concomitant in time to a pilot OFDM symbol for all the other send antennas. A pilot OFDM symbol is an OFDM symbol containing pilot symbols. In this particular type of frame, a pilot OFDM symbol comprises only pilot symbols. FIG. 1a illustrates this technique for constructing type 1 frames for two send antennas TX1 and TX2. In the first OFDM symbol period, the send antenna TX1 sends a pilot OFDM symbol and at the same time the OFDM symbol sent by the antenna TX2 includes only null carriers, typically modulated by null symbols sn. In the second OFDM symbol period, the send antenna TX2 sends a pilot OFDM symbol and at the same time the OFDM symbol sent by the antenna TX1 includes only null carriers, typically modulated by null symbols sn. This technique reduces the spectral efficiency of all the send antennas compared to a single-antenna frame. It requires a number of OFDM symbols for estimating the channels equal to the number of send antennas and the number of pilot OFDM symbols present in an SISO (Single Input Single Output) frame is consequently multiplied by the number of send antennas.

A second technique, illustrated by FIG. 1b, described in the paper by J. Moon, H. Jin, T. Jeon and S.-K. Li "Channel estimation for MIMO-OFDM Systems employing Spatial Multiplexing", Vehicular Technology Conference, Vol. 5, September 2004, sends in the same OFDM symbol period a pilot symbol at a particular carrier frequency fp at one send antenna and a null symbol sn at the same frequency at the other send antennas, which avoids interference with the received pilot symbol sp. FIG. 1b illustrates this technique for constructing type 2 frames for two send antennas TX1 and TX2. This technique amounts to using non-contiguous sets of sub-carriers for the training sequences sent at the various antennas. This type of construction leads to a loss of spectral efficiency because of the presence of imposed null symbols sn in an OFDM symbol concomitant in time with an OFDM symbol including pilot symbols sp. After sending a pilot OFDM symbol, the antenna TX1, respectively TX2, can send data symbols sd at the various carrier frequencies.

A third technique, illustrated by FIG. 1c, described in the paper by E. G. Larsson and J. Li, "Preamble Design for Multiple-Antenna OFDM-Based WLANs With Null Subcarriers", IEEE Signal Processing, Vol. 8, No. 11, 2001, involves constructing training sequences by Alamouti-type space-frequency coding. FIG. 1c illustrates this technique for constructing type 3 frames for two send antennas TX1 and TX2. A major drawback of this kind of technique is that, because of the orthogonal pattern mo, it increases the number of pilot symbols sp in an OFDM symbol compared to a SISO frame and assumes that the channel is constant over a certain number of sub-carriers.

To remove the constraints of previous techniques, some linked to the imposed presence of null symbols, in order to retain the disposition of the pilot symbols of a single-antenna frame between the various send antennas, and in order to use the same set of sub-carriers for all pilot frequencies, a known solution uses the principle whereby a pulse, or more generally a reference sequence, is sent at each send antenna and is shifted in time so that the receiver connected to each receive antenna can isolate in the time domain the impulse responses of the various transmission channels.

This principle is employed in the techniques described in the paper by M.-S. Baek, H.-J. Kook, M.-J. Kim, Y.-H. You and H-S. Song, "Multi-Antenna Scheme for High Capacity Transmission in Digital Audio Broadcasting", IEEE Transactions on Broadcasting, Vol. 51, No. 4, December 2005 and in the paper by I. Barhumi, G. Leus and M. Moonen, "Optimal Training Design for MIMO OFDM Systems in Mobile Wireless Channels", IEEE Transactions on Signal Processing, Vol. 51, No. 6, June 2003. In the first of those papers, the set of sub-carriers of an OFDM symbol is dedicated to channel estimation, enabling the receiver to recover the various impulse responses prior to OFDM demodulation. In contrast, in the second paper, multiplexing the payload data symbols and the pilot symbols, where the pilot symbols are distributed over one or more OFDM symbols to form a training sequence, implies that the impulse response recovery operation in the receiver is effected after OFDM demodulation. This operation employs a matrix A constructed from the training sequence and a Fourier matrix with appropriate dimensions. The coefficients of the various impulse responses are estimated by multiplying the demodulated received signal by the pseudo-inverse matrix of the matrix A.

The Baek technique has the advantage over the Teng technique of avoiding the imposed presence of null pilot symbols and thus offers higher spectral efficiency. It has the advantage over the Moon technique that it estimates the channel for all modulated carriers. The Barhumi technique offers greater spectral efficiency than the Teng, Moon and Larsson techniques. Table 1 in Appendix A (see below) compares the relative amount of payload data for a given number of OFDM symbols per frame for the various techniques referred to above and for two send antennas.

However, the Baek and Barhumi techniques offer poor performance if the time-frequency frames to be sent include null carriers at the edges of the spectrum, these edge null carriers typically being used to reduce the spectral occupation of the sent signal that can interfere with adjacent bands. These techniques then lead to edge effects that degrade system performance compared to a system with perfect channel estimation.

SUMMARY OF THE INVENTION

One aspect of the present invention is directed to a method of estimating transmission channels in a multi-antenna system using $N_t$ send antennas, where $N_t$ is greater than or equal to 2, at least one receive antenna, a time-frequency frame for each send antenna comprising pilot symbols forming a training sequence and data symbols of a payload signal, the $N_t$ time-shifted training sequences being known to the receiver and enabling the receiver to estimate $N_t$ impulse responses corresponding to the $N_t$ transmission channels linking a send antenna to the respective receive antenna $RX_j$ concerned, the data symbols and the pilot symbols being frequency-modulated by an orthogonal multiplexer to form orthogonal symbols that are sent by the send antennas in the form of a multi-carrier signal with $N_{FFT}$ carriers including $N_p$ pilot carriers and null carriers, which is based on the principle outlined above using a matrix A and avoiding the edge effects of known techniques.

The matrix A is calculated constructed in the form of blocks from training sequences and from a Fourier matrix with dimensions $N_{FFT} \times N_{FFT}$. For a receive antenna $RX_j$ concerned, the step of calculating matrix A comprises a step of calculating the $N_t$ impulse responses in the time domain by multiplying $N_p$ pilot symbols extracted from a frequency-domain signal $R^j(n)$ obtained after demodulation of a time-domain signal received by the receive antenna $RX_j$ concerned by means of an FFT of size $N_{FFT}$ by a product of matrices comprising the pseudo-inverse matrix of the product of the Hermitian matrix of the A matrix with the A matrix enabling decorrelation of the modulated carriers adjacent null carriers.

Another aspect of the invention is directed to a module for estimating transmission channels in a multi-antenna system. The module comprises:

means for calculating a matrix A constructed in the form of blocks from training sequences and from a Fourier matrix with dimensions $N_{FFT} \times N_{FFT}$;

wherein for a receive antenna concerned, the means for calculating a matrix A comprises means for calculating the $N_t$ impulse responses in the time domain by multiplying $N_p$ pilot symbols extracted from a frequency-domain signal $R^j(n)$ obtained after demodulation of a time-domain signal received by the receive antenna $RX_j$ concerned by means of an FFT of size $N_{FFT}$ by a product of matrices comprising the pseudo-inverse matrix of the product of the Hermitian matrix of the A matrix with the A matrix enabling decorrelation of the modulated carriers adjacent null carriers.

The described channel estimation method and module decorrelate in the receiver modulated carriers adjacent null carriers.

In one particular embodiment, calculating the $N_t$ impulse responses is limited to the $N_p$ pilot carriers. In a variant, calculation is further limited to the shortest time shift between two antennas. These limitations advantageously limit the calculations and therefore reduce the calculation power necessary for implementing the method.

In one particular embodiment, the step of calculating the $N_t$ impulse responses is repeated for each receive antenna concerned of the multi-antenna system. This embodiment is particularly suitable for systems including multiple receive antennas.

Another aspect of the invention is directed to a receiver for a multi-antenna system. The receiver includes the above transmission channel estimation module.

Another aspect of the invention is directed to a multi-antenna system including the above receiver.

In the context of the invention, the multi-antenna system with at least two send antennas is either a MIMO system or a MISO system. In the following description, a MIMO system must be understood as a system with multiple send antennas regardless of the number of receive antennas ($N_r \geq 1$).

In a preferred embodiment, the steps of the method are determined by instructions of an estimation program incorporated into an electronic circuit such as a microchip that can be included in an electronic device such as a transmitter. The method of the invention can be executed when this program is loaded into a computation unit such as a processor or the like whose operation is then controlled by the execution of the program.

Consequently, the invention also provides a computer program adapted to implement the invention, in particular a computer program on or in an information medium, that can use any programming language and can be in the form of source code, object code or an intermediate code between source code and object code, for example in a partially-compiled form or any other form desirable for implementing a method of the invention.

The information medium can be any entity or device capable of storing the program. For example, it can include storage means, such as ROM, for example a CD ROM or a microelectronic circuit ROM, or magnetic storage means, for example a diskette (floppy disk) or hard disk.

Alternatively, the information medium can be an integrated circuit into which the program is incorporated, the circuit being adapted to execute the method in question or to be used in its execution.

Moreover, the estimation program can be translated into a transmissible form such as an electrical or optical signal, which can be routed via an electrical or optical cable, by radio or by other means. The program of the invention can in particular be downloaded over an Internet-type network.

BRIEF DESCRIPTION OF THE DRAWINGS

FIGS. 1a, 1b and 1c are illustrations of known frame constructions of types 1, 2 and 3, respectively, for a system with two send antennas.

FIG. 2 is a flowchart of an estimation method of the invention.

DETAILED DESCRIPTION OF THE DRAWINGS

Figure 3:
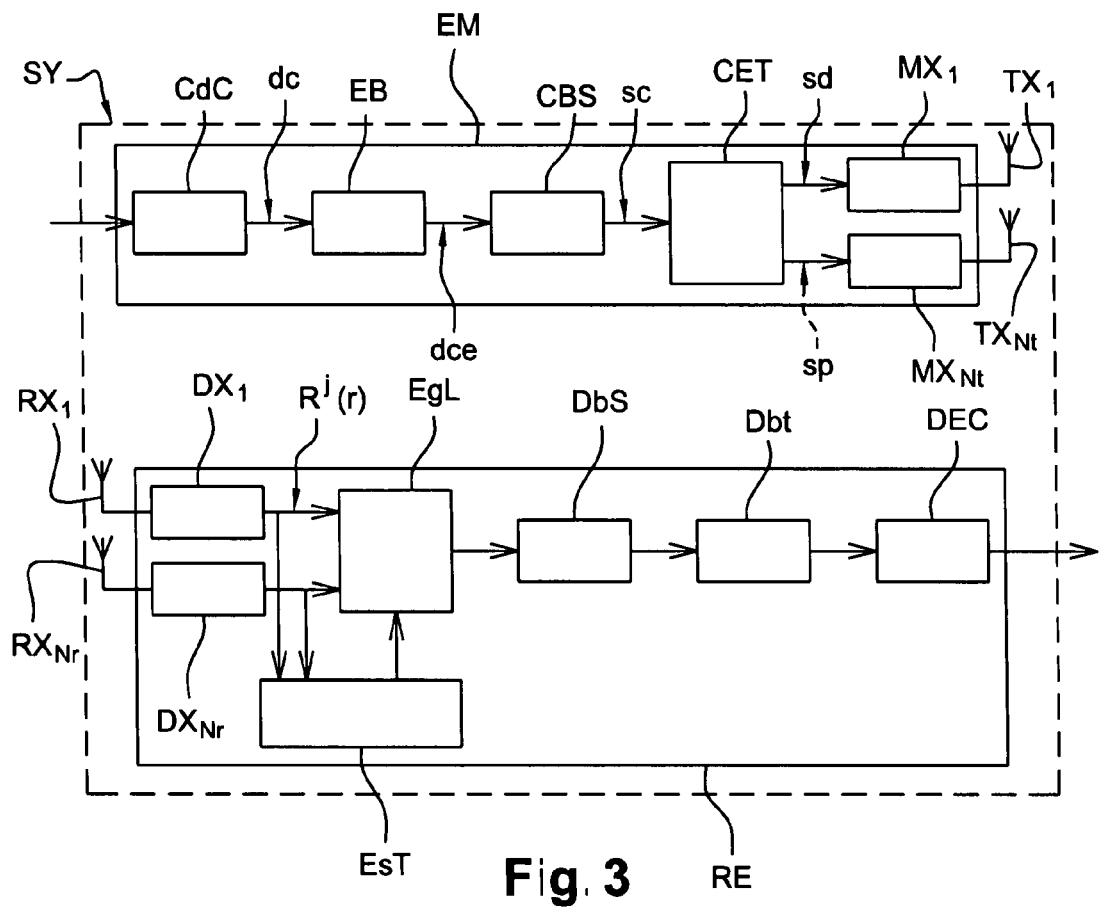
FIG. 3 is a diagram of one particular transmission system of the invention enabling implementation of a method of the invention.

FIG. 2 is a flowchart of an estimation method of the invention.

An estimation method of the invention estimates transmission channels in a multi-antenna system. A transmission channel links a send antenna $TX_i$ to a receive antenna $RX_j$. A multi-antenna system uses $N_t \geq 2$ send antennas, at least one receive antenna, and a time-frequency frame for each send antenna. A time-frequency frame determines the temporal location of payload data symbols and pilot symbols on the various carriers. The time-frequency frame can further include null symbols, but as these are not involved in the estimation method, they are not referred to in this description. Nor does the description refer to the guard carriers, as they are not involved in the estimation method either. The pilot symbols for the same send antenna form a training sequence. The $N_t$ training sequences are temporally offset from each other within a time interval. They are known to the receiver and enable it to estimate $N_t$ impulse responses that correspond to the $N_t$ transmission channels. The data symbols and pilot symbols are frequency-modulated by an orthogonal multiplexer to form orthogonal symbols that are sent by the send antenna connected to the orthogonal multiplexer in the form of a multi-carrier signal with $N_{FFT}$ carriers including $N_p$ pilot carriers and null carriers. Depending on the time-frequency frame concerned, the pilot symbols can be distributed over one or more orthogonal symbols. In one particular embodiment the modulation is OFDM modulation.

An estimation method of the invention is executed in the receiver after a demodulation step which demodulates a time-domain signal received by the receive antenna $RX^j$ concerned by means of an FFT of size $N_{FFT}$ to obtain a frequency-domain signal $R^j(n)$ and to extract therefrom $N_p$ pilot symbols. In one particular embodiment, the demodulation is OFDM demodulation. The size $N_{FFT}$ of the FFT is typically determined as a function of the size of the inverse FFT applied on sending. These sizes are typically made identical.

The estimation method 1 of the invention includes a step 2 of calculating a matrix A and, for a given receive antenna $RX_j$, a step 3 of calculating the $N_t$ impulse responses in the time domain of the $N_t$ channels linking a send antenna $TX_i$ to the respective receive antenna $RX_j$. To obtain the $N_r \times N_t$ channels, it is necessary to repeat step 3 for the various receive antennas $RX_j$.

The calculation step 2 calculates a matrix A constructed in the form of blocks from training sequences and a Fourier matrix with dimensions $N_{FFT} \times N_{FFT}$.

The step 3 of calculating the $N_t$ impulse responses in the time domain multiplies the $N_p$ pilot symbols with a product of matrices comprising the pseudo-inverse matrix of the product of the Hermitian matrix of the A×A matrix. This multiplication by the product of particular matrices decorrelates the modulated carriers adjacent null carriers.

FIG. 3 is a diagram of a particular transmission system implementing a method of the invention.

The transmission system SY includes a multi-carrier sender device EM and a receiver device RE. The sender device EM is connected to $N_t$ send antennas $TX_1, \ldots, TX_{Nt}$, where $N_t \geq 2$. The receiver device RE is connected to $N_r$ receive antennas $RX_1, \ldots, RX_{Nr}$, where $Nr \geq 1$.

In the example shown, the sender device EM includes a channel coder module CdC, a bit interleaver EB, a binary to symbol coding module CBS, a space-time coding module CET, and as many OFDM multiplexers MX as there are send antennas.

The channel coding module CdC codes input source data corresponding to one or more signals, typically telecommunication signals, to supply coded output data dc, for example using a convolutional code.

The bit interleaver interleaves the bits of the coded data in accordance with a particular interleaving law to supply interleaved coded data dce.

The symbol to binary coding module CBS transforms the interleaved coded data dce into complex data symbols sc, for example by BPSK (binary phase-shift keying), QPSK (quadraphase-shift keying) or 16-QAM (quadrature amplitude modulation) modulation.

The space-time coding module CET determines from the complex data symbols sc a two-dimensional matrix of data symbols sd, for example in accordance with an Alamouti-type code, and generates pilot symbols.

Each OFDM multiplexer modulates the data symbols sd and pilot symbols sp inserted at the input of the multiplexer by sinusoidal sub-carriers having orthogonal functions that are the conjugate Fourier components of an inverse Fourier transform of size $N_{FFT}$ corresponding to the number of carriers of an OFDM multiplex. The $N_{FFT}$ carriers comprise $N_{mod}$ modulated data carriers and $N_p$ pilot carriers. The set of $N_{FFT}$ carriers is referred to as an OFDM symbol. The OFDM symbols can include null carriers and guard carriers that are not modulated. The output of an OFDM multiplexer constitutes the time-domain OFDM signal without guard intervals.

Prior to sending, the sender device inserts a guard interval into the OFDM signal.

The signals sent include reference sequences. For each send antenna concerned, a reference sequence is determined by the pilot symbols contained in one or more OFDM symbols. The sequence is determined by the number g of these OFDM symbols, the amplitude of the pilot symbols, and the pilot carriers. The reference sequences are identical to each other but time-shifted relative to each other by an interval $\Delta t$ least equal to the maximum length L of the transmission channels, $\Delta_t \geq L$, so that the impulse responses of the various channels do not interfere with each other. The time to transmit of a channel or the transmission delay introduced by the channel is referred to as the length of the channel. The interval $\Delta t$ must be understood as a number of time intervals between samples. The time shift between reference sequences is typically applied before the OFDM modulation by phase-shifting the pilot symbols in the various reference sequences in the frequency domain.

If $c(p)$, $p=0,\ldots,N_p-1$ denotes the pilot symbol sent on the carrier frequency of index p at the send antenna $TX_1$, the pilot symbol sent in the same OFDM symbol period at the antenna $TX_i$ is equal to:

$$c(p)^i = c(p)e^{-j2\pi \frac{p(i-1)\Delta t}{N_p}} \quad (1)$$

Moreover, the condition for determining all the impulse responses is $N_t \times \Delta t \leq N_p$.

In the example illustrated, the receiver device RE includes as many OFDM demultiplexers $DX_1, \ldots, DX_{N_r}$ as there are receive antennas $RX_1, \ldots, RX_{N_r}$. It further includes a channel estimation module EsT, an equalization module EgL, a symbol to binary decoding module DbS, a bit de-interleaver Dbt, and a channel decoder module DEC.

Each signal received by a receive antenna is processed by an OFDM demultiplexer. An OFDM demultiplexer applies the function that is the inverse of the function of an OFDM multiplexer. Thus an OFDM demultiplexer applies a direct Fourier transform of size $N_{FFT}$ to the received signal, after elimination of the guard time. An OFDM demultiplexer demodulates a time-domain signal received by the receive antenna $RX_j$ concerned by means of an FFT of size $N_{FFT}$ to obtain a frequency-domain signal $R^j(n)$ and extract $N_p$ pilot symbols from it.

The outputs of the OFDM demultiplexer supply frequency-domain OFDM signals $R^j(n)$ that are processed by the estimation module and the equalization module.

The signal from the receive antenna $RX_j$ can be expressed in the frequency domain at the time n, i.e. after elimination of the guard time and after OFDM demodulation, in the form of a column vector of dimension $N_{FFT}$:

$$R^j(n) = \sum_{i=1}^{N_t} diag\{X^i(n)\} F h^{j,i} + \Xi^j(n) \quad (2)$$

where $X^i(n)$ is a vector of dimension $N_{FFT}$, the OFDM symbol sent at the time n at the antenna $TX_j$;

F is the Fourier matrix with dimensions $N_{FFT} \times N_{FFT}$;

$h^{j,i}(n)$ is the column vector representing the L samples of the frequency response of the sub-channel linking the send antenna $TX_i$ to the receive antenna $RX_j$; and $\Xi^j(n)$ is the column vector of dimension $N_{FFT}$ representing the Fourier transform of Gaussian additive white noise.

To simplify the calculations, which is advantageous, the estimation method processes the demodulated signal according to equation (2) only over the period $\Delta t$:

$$R^j(n) = \sum_{i=1}^{N_t} diag\{X^i(n)\} F' h'^{j,i} + \Xi^j(n) \quad (3)$$

F' is the matrix containing the first $\Delta t$ columns of the Fourier matrix F with dimensions $N_{FFT} \times N_{FFT}$ and $h'^{i,j}$ is a column vector of size $\Delta t$ such that:

$$h'^{j,i} = [h^{j,i T}, 0_{\Delta t-L}]^T \quad (4)$$

A diagonal matrix having the column vector $\underline{x}$ on its diagonal is denoted $diag\{\underline{x}\}$:

$$diag\begin{bmatrix} a \\ b \\ c \end{bmatrix} = \begin{bmatrix} a & 0 & 0 \\ 0 & b & 0 \\ 0 & 0 & c \end{bmatrix} \quad (5)$$

The Fourier matrix F is a square matrix with dimensions $N_{FFT} \times N_{FFT}$ of the following form:

$$F = \frac{1}{\sqrt{N_{FFT}}} \begin{bmatrix} 1 & 1 & 1 & \ldots & 1 \\ 1 & w_{N_{FFT}} & w_{N_{FFT}}^2 & \ldots & w_{N_{FFT}}^{N_{FFT}-1} \\ \vdots & \vdots & \vdots & \ldots & \vdots \\ 1 & w_{N_{FFT}}^{N_{FFT}-1} & w_{N_{FFT}}^{2(N_{FFT}-1)} & \ldots & w_{N_{FFT}}^{(N_{FFT}-1)(N_{FFT}-1)} \end{bmatrix} \quad (6)$$

in which $w_{N_{FFT}} = e^{-j\frac{2\pi}{N_{FFT}}}$.

The matrix F' is deduced directly from F:

$$F' = \frac{1}{\sqrt{N_{FFT}}} \begin{bmatrix} 1 & 1 & 1 & \ldots & 1 \\ 1 & w_{N_{FFT}} & w_{N_{FFT}}^2 & \ldots & w_{N_{FFT}}^{\Delta t-1} \\ \vdots & \vdots & \vdots & \ldots & \vdots \\ 1 & w_{N_{FFT}}^{N_{FFT}-1} & w_{N_{FFT}}^{2(N_{FFT}-1)} & \ldots & w_{N_{FFT}}^{(\Delta t-1)(\Delta t-1)} \end{bmatrix} \quad (7)$$

Each OFDM symbol $X^i(n)$ sent at the time n by the send antenna $TX_i$ can be broken down into a vector containing the data symbols and a vector containing the pilot symbols:

$$X^i(n) = S^i(n) + B^i(n) \quad (8)$$

where $S^i(n)$ is the vector of the payload data symbols with dimension $N_{FFT}$ and $B^i(n)$ is the vector of the pilot symbols with the same dimension.

Equation (3) can therefore be expressed in the form:

$$R^j(n) = \sum_{i=1}^{N_t} diag\{S^i(n) + B^i(n)\} F' h'^{j,i} + \Xi^j(n) \quad (9)$$

Knowing that $\Delta t \geq L$, we can impose $\Delta t = L$. With this condition, the accumulation of received vectors corresponding to the g orthogonal symbols sent containing pilot symbols constituting a training sequence can be expressed in the form:

$$R^j = [R^j(0)^T \ldots R^j(g-1)^T]^T \quad (10)$$
$$= Th'^j + Ah'^j + \Xi^j$$

where $R^j$ is a column vector of dimension $N_{FFT} \times g$;

T is a matrix with dimensions $(N_{FFT} \times g) \times (N_t \times \Delta t)$ containing the payload data symbols during the training sequences (of the $N_t$ send antennas);

$$T = \begin{bmatrix} S_{diag}^1(0)F' & \ldots & S_{diag}^{N_1}(0)F' \\ \vdots & & \vdots \\ S_{diag}^1(g-1)F' & \ldots & S_{diag}^{N_t}(g-1)F' \end{bmatrix} \quad (11)$$

A is a matrix with dimensions $(N_{FFT} \times g) \times (N_t \times \Delta t)$ containing the pilot symbols during the training sequences (of the $N_t$ send antennas);

$$A = \begin{bmatrix} B_{diag}^1(0)F' & \ldots & B_{diag}^{N_1}(0)F' \\ \vdots & & \vdots \\ B_{diag}^1(g-1)F' & \ldots & B_{diag}^{N_1}(g-1)F' \end{bmatrix} \quad (12)$$

$h'^j$ is the column vector of dimension $N_t \times \Delta t$ containing the $N_t$ impulse responses;

$$h'^j = [h'^{j,1^T}, \ldots, h'^{j,N_t^T}]^T \quad (13)$$

$\Xi^j$ is the column vector of dimension $N_{FFT} \times g$ containing $g$ representations of the Fourier transform of Gaussian additive white noise.

The channel estimation module includes means for calculating the matrix A using equation (12), typically instructions of a program that in a preferred embodiment is incorporated in an electronic circuit, a calculation unit such as a processor or the like whose operation is then controlled by the execution of the program.

To estimate the impulse response vector from the received signal RJ, Barhumi uses the following equation:

$$\hat{h}^j = A^+ R^j \quad (14)$$

in which the symbol $^+$ signifies the pseudo-inverse. The pseudo-inverse operation is the following operation:

$$A^+ = (A^H A)^{-1} A^H \quad (15)$$

To eliminate the interference terms caused by the data symbols present in the OFDM symbol, the product of $A^+$ and T must be equal to a null matrix, which is made possible by imposing non-contiguous sets of pilot symbols and data symbols. Furthermore, calculating the impulse responses can be simplified by considering in the equations only the frequencies dedicated to channel estimation, i.e. by limiting the calculations to the pilot carriers:

$$\hat{h}^j = \tilde{A}^+ \tilde{R}^j \quad (16)$$

where $\tilde{R}^j$ is the matrix with dimensions $(N_p \times g) \times 1$ extracted from $R^j$ considering only the pilot carriers; and $\tilde{A}$ is the matrix with dimensions $(N_p \times g) \times (N_t \times \Delta t)$;

$$\tilde{A} = \begin{bmatrix} \tilde{B}_{diag}^1(0)\tilde{F}' & \ldots & \tilde{B}_{diag}^{N_t}(0)\tilde{F}' \\ \vdots & & \vdots \\ \tilde{B}_{diag}^1(g-1)\tilde{F}' & \ldots & \tilde{B}_{diag}^{N_t}(g-1)\tilde{F}' \end{bmatrix} \quad (17)$$

The estimated value $\hat{h}^j$ is therefore a column vector containing the $N_t$ impulse responses. To obtain separately the various frequency responses of the sub-channels necessary for the equalization phase, the method effects vector windowing of the estimated vector $\hat{h}^j$.

If there are null sub-carriers at the edges of the spectrum, the Barhumi solution, equations (14) and (16), leads to edge effects, i.e. to discontinuities at the edges of the spectrum, and this degrades performance.

A solution according to the invention effects an estimate of the impulse responses $\hat{h}^j$ using the following equation instead of equation (16):

$$\hat{h}^j = (\tilde{A}^H \tilde{A})^+ \tilde{A}^H \tilde{R}^j \quad (18)$$

According to this equation, the estimate of the vector of the impulse responses $h^j$ is equal to a product of matrices with the received signal $\tilde{R}^j$. The product of matrices is equal to the product of the pseudo-inverse matrix of the product of the Hermitian matrix of the $\tilde{A}$ matrix with the $\tilde{A}$ matrix with the Hermitian matrix of $\tilde{A}$.

The multiplication by the pseudo-inverse matrix of the matrices product $\tilde{A}^H \times \tilde{A}$ decorrelates the modulated carrier and null carrier regions.

The channel estimation module includes means for calculating the $N_t$ impulse responses $\hat{h}^j$ using equation (18), typically instructions of a program which in a preferred embodiment is incorporated in an electronic circuit, a calculation unit such as a processor or the like of operation that is then controlled by the execution of the program.

Knowing the parameters of the multi-antenna system (the size $N_{FFT}$ of the FFT, the number $N_{mod}$ of modulated carriers, the time shift $\Delta t$ between reference sequences, the number $g$ of pilot OFDM symbols forming a reference sequence, and the amplitude $c(p)$ of the pilot symbols), an estimation method and module of the invention advantageously pre-calculate the product of matrices corresponding to the expression:

$$(\tilde{A}^H \tilde{A})^+ \tilde{A}^H \quad (19)$$

In a preferred embodiment, the estimation method, respectively the estimation module, multiplies this pre-calculated product of matrices with the demodulated OFDM signal to obtain an estimate of the $N_t$ channels accumulated in the expression for $\hat{h}^j$ according to equation (18).

To obtain an estimate of the $N_r \times N_t$ channels, the calculation of $\hat{h}^j$ must be repeated for j varying from 1 to $N_r$.

The vector expression for the channel $\hat{h}^{j,i}$ linking the particular send antenna i, for i assuming a value from 1 to $N_t$, to the particular receive antenna j, for j assuming a value from 1 to Nr, is obtained by making a selection from the $N_p$ successive samples of the column vector $\hat{h}^j$ calculated for the receive antenna j, starting from the sample $(i-1) \times N_p$.

In one particular embodiment of the method, the calculation of the $N_t \times N_r$ impulse responses previously described for the $N_p$ pilot carriers is completed by an interpolation that can be linear in time or linear in frequency (one-dimensional (1D) interpolation) to obtain the coefficients of each channel for all of the carriers modulated with payload data. The interpolation can be of an order higher than one.

The following two examples illustrate the calculation of the expression for $\hat{A}$ and, for the first example, also the expression (19): $(\tilde{A}^H\tilde{A})^+\tilde{A}^H$.

First Example

The parameters of the system take the following values: $N_{FFT}=8$, $N_{mod}=6$, and $\Delta t=2$. The unmodulated sub-carriers are assumed to be situated at the two ends of the spectrum. It is assumed that only one OFDM symbol is necessary for estimating the channel (g=1), and the pattern of that OFDM symbol, which constitutes a reference sequence, is represented in Table 2. The first column represents the frequency-domain indices and the second the associated data type (N=null carrier, P=pilot symbol, D=payload data).

TABLE 2

| Pattern of pilots distributed in the time-frequency plane | |
|---|---|
| 0 | N |
| 1 | P |
| 2 | D |
| 3 | P |
| 4 | D |
| 5 | P |
| 6 | P |
| 7 | N |

The transmission system comprises $N_2=2$ send antennas and $N_r=1$ receive antenna. Equation (2) gives the expression for the pilot symbol modulating the carrier p for the reference sequence sent by the send antenna $TX_i$, with i=1 or 2:

$$c(p)^1 = c(p)e^{-j2\pi\frac{p(1-1)2}{4}} = c(p)$$
$$c(p)^2 = c(p)e^{-j2\pi\frac{p2}{4}} = c(p)e^{-j\pi p}$$

$c(p)^1$ is therefore the pilot symbol modulating the carrier frequency p for the reference sequence sent by the send antenna $TX_1$ and $c(p)^2$ is the pilot symbol modulating the carrier frequency p for the reference sequence sent by the send antenna $TX_2$.

In the example, c(p)=1 for all the pilot carriers. The vectors of the pilot symbols $B^1$ and $B^2$ and the extracted vectors limited to the pilot carriers $\tilde{B}^1$ and $\tilde{B}^2$ are then expressed in the form:

$$B^1 = \begin{bmatrix} 0 \\ 1 \\ 0 \\ 1 \\ 0 \\ 1 \\ 1 \\ 0 \end{bmatrix} \Rightarrow \tilde{B}^1 = \begin{bmatrix} 1 \\ 1 \\ 1 \\ 1 \end{bmatrix} \quad B^2 = \begin{bmatrix} 0 \\ 1 \\ 0 \\ e^{-j\pi} \\ 0 \\ e^{-j2\pi} \\ e^{-j2\pi} \\ 0 \end{bmatrix} = \begin{bmatrix} 0 \\ 1 \\ 0 \\ -1 \\ 0 \\ 1 \\ 1 \\ 0 \end{bmatrix} \Rightarrow \tilde{B}^2 = \begin{bmatrix} 1 \\ -1 \\ 1 \\ -1 \end{bmatrix}$$

The Fourier matrix F is as follows:

$$F = \frac{1}{\sqrt{8}}\begin{bmatrix} 1 & 1 & 1 & 1 & 1 & 1 & 1 & 1 \\ 1 & 0.707-0.707j & -j & -0.707-0.707j & -1 & -0.707+0.707j & j & 0.707+0.707j \\ 1 & -j & -1 & j & 1 & -j & -1 & j \\ 1 & -0.707-0.707j & j & 0.707-0.707j & -1 & 0.707+0.707j & -j & -0.707+0.707j \\ 1 & -1 & 1 & -1 & 1 & -1 & 1 & -1 \\ 1 & -0.707+0.707j & -j & 0.707+0.707j & -1 & 0.707-0.707j & j & -0.707-0.707j \\ 1 & j & -1 & -j & 1 & j & -1 & -j \\ 1 & 0.707+0.707j & j & -0.707+0.707j & -1 & -0.707-0.707j & -j & 0.707-0.707j \end{bmatrix}$$

in which the symbol j represents the square root of minus one, i.e. the solution of the equation $j^2=-1$. The matrices F' and $\tilde{F}'$ are expressed in the following form:

$$F' = \frac{1}{\sqrt{8}}\begin{bmatrix} 1 & 1 \\ 1 & 0.707-0.707j \\ 1 & -j \\ 1 & -0.707-0.707j \\ 1 & -1 \\ 1 & -0.707+0.707j \\ 1 & j \\ 1 & 0.707+0.707j \end{bmatrix} \Rightarrow$$

$$\tilde{F}' = \frac{1}{\sqrt{8}}\begin{bmatrix} 1 & 0.707-0.707j \\ 1 & -0.707-0.707j \\ 1 & -0.707+0.707j \\ 1 & 0.707+0.707j \end{bmatrix}$$

The matrix $\tilde{A}$ is then expressed in the following form:

$$\tilde{A} = \frac{1}{\sqrt{8}}\begin{bmatrix} 1 & 0.707-0.707j & 1 & 0.707-0.707j \\ 1 & -0.707-0.707j & -1 & 0.707+0.707j \\ 1 & -0.707+0.707j & 1 & -0.707+0.707j \\ 1 & 0.707+0.707j & -1 & -0.707+0.707j \end{bmatrix}$$

whence the following expressions for $\tilde{A}^H$, $(\tilde{A}^H\tilde{A})^+$ and $(\tilde{A}^H\tilde{A})^+\tilde{A}^H$:

$$\tilde{A}^H = \frac{1}{\sqrt{8}}\begin{bmatrix} 1 & 1 & 1 & 1 \\ 0.707+0.707j & -0.707+0.707j & -0.707-0.707j & 0.707-0.707j \\ 1 & -1 & 1 & -1 \\ 0.707+0.707j & 0.707-0.707j & -0.707-0.707j & -0.707+0.707j \end{bmatrix}$$

$$(\tilde{A}^H\tilde{A})^+ = \begin{bmatrix} 2 & 0 & 0 & 0 \\ 0 & 2 & 0 & 0 \\ 0 & 0 & 2 & 0 \\ 0 & 0 & 0 & 2 \end{bmatrix}$$

$$(\tilde{A}^H\tilde{A})^+\tilde{A}^H = \begin{bmatrix} 0.707 & 0.707 & 0.707 & 0.707 \\ 0.5+0.5j & -0.5+0.5j & -0.5-0.5j & 0.5-0.5j \\ 0.707 & -0.707 & 0.707 & -0.707 \\ 0.5+0.5j & 0.5-0.5j & -0.5-0.5j & -0.5+0.5j \end{bmatrix}$$

Second Example

The parameters of the system take the following values: $N_{FFT}=8$, $N_{mod}=6$, and $\Delta_t=2$. The transmission system comprises $N_t=3$ send antennas and $N_r=1$ receive antenna. The number of pilot carriers $N_p=4$ is now insufficient because the condition $N_t \times \Delta_t \leq N_p$ is not satisfied. It is therefore necessary for this transmission system to have at the minimum $N_p=6$, for example $N_p=N_{mod}=6$. The unmodulated sub-carriers are assumed to be situated at the two ends of the spectrum. It is assumed that only one OFDM symbol is needed to estimate the channel (g=1), and the pattern of that OFDM symbol, which constitutes a reference sequence, is represented in Table 3. The first column represents the frequency-domain indices and the second column the associated data type (N=null carrier, P=pilot symbol).

TABLE 3

Pattern of pilots distributed in the time-frequency plane

| | |
|---|---|
| 0 | N |
| 1 | P |
| 2 | P |
| 3 | P |
| 4 | P |
| 5 | P |
| 6 | P |
| 7 | N |

Equation (2) gives the expression for the pilot symbol modulating the carrier p for the reference sequence sent by the send antenna $TX_i$, with i=1, 2 or 3:

$$c(p)^1 = c(p)e^{-j2\pi \frac{p(1-1)2}{4}} = c(p)$$

$$c(p)^2 = c(p)e^{-j2\pi \frac{p2}{6}} = c(p)e^{-jp\frac{2\pi}{3}}$$

$$c(p)^3 = c(p)e^{-j2\pi \frac{p\times 2\times 2}{6}} = c(p)e^{-jp\frac{4\pi}{3}}$$

$c(p)^1$ is therefore the pilot symbol modulating the carrier frequency p for the reference sequence sent by the send antenna $\overline{TX_1}$, $c(p)^2$ is the pilot symbol modulating the carrier frequency p for the reference sequence sent by the send antenna $\overline{TX_2}$, and $C(p)^3$ is the pilot symbol modulating the carrier frequency p for the reference sequence sent by the send antenna $\overline{TX_3}$.

In the example, c(p)=1 for all the pilot carriers. The vectors of the pilot symbols $B^1$, $B^2$ and $B^3$ and the extracted vectors limited to the pilot carriers, $\tilde{B}^1$, $\tilde{B}^2$ and $\tilde{B}^3$ are then expressed in the form:

$$B^1 = \begin{bmatrix} 0 \\ 1 \\ 1 \\ 1 \\ 1 \\ 1 \\ 1 \\ 0 \end{bmatrix} \Rightarrow \tilde{B}^1 = \begin{bmatrix} 1 \\ 1 \\ 1 \\ 1 \\ 1 \\ 1 \end{bmatrix} \quad B^2 = \begin{bmatrix} 0 \\ 1 \\ e^{-j\frac{2\pi}{3}} \\ e^{-j\frac{4\pi}{3}} \\ e^{-j\frac{6\pi}{3}} \\ e^{-j\frac{8\pi}{3}} \\ e^{-j\frac{10\pi}{3}} \\ 0 \end{bmatrix} \Rightarrow \tilde{B}^2 = \begin{bmatrix} 1 \\ e^{-j\frac{2\pi}{3}} \\ e^{-j\frac{4\pi}{3}} \\ 1 \\ e^{-j\frac{8\pi}{3}} \\ e^{-j\frac{10\pi}{3}} \end{bmatrix}$$

$$B^3 = \begin{bmatrix} 0 \\ 1 \\ e^{-j\frac{4\pi}{3}} \\ e^{-j\frac{8\pi}{3}} \\ e^{-j\frac{12\pi}{3}} \\ e^{-j\frac{16\pi}{3}} \\ e^{-j\frac{20\pi}{3}} \\ 0 \end{bmatrix} \Rightarrow \tilde{B}^3 = \begin{bmatrix} 1 \\ e^{-j\frac{4\pi}{3}} \\ e^{-j\frac{8\pi}{3}} \\ 1 \\ e^{-j\frac{4\pi}{3}} \\ e^{-j\frac{2\pi}{3}} \end{bmatrix}$$

The Fourier matrix F is as follows:

$$F = \frac{1}{\sqrt{8}}\begin{bmatrix} 1 & 1 & 1 & 1 & 1 & 1 & 1 & 1 \\ 1 & 0.707-0.707j & -j & -0.707-0.707j & -1 & -0.707+0.707j & j & 0.707+0.707j \\ 1 & -j & -1 & j & 1 & -j & -1 & j \\ 1 & -0.707-0.707j & j & 0.707-0.707j & -1 & 0.707+0.707j & -j & -0.707+0.707j \\ 1 & -1 & 1 & -1 & 1 & -1 & 1 & -1 \\ 1 & -0.707+0.707j & -j & 0.707+0.707j & -1 & 0.707-0.707j & j & -0.707-0.707j \\ 1 & j & -1 & -j & 1 & j & -1 & -j \\ 1 & 0.707+0.707j & j & -0.707+0.707j & -1 & -0.707-0.707j & -j & 0.707-0.707j \end{bmatrix}$$

in which the symbol j represents the square root of minus one, i.e. the solution of the equation $j^2=-1$. The matrices F' and $\tilde{F}'$ are expressed in the following form:

$$F' = \frac{1}{\sqrt{8}}\begin{bmatrix} 1 & 1 \\ 1 & 0.707-0.707j \\ 1 & -j \\ 1 & -0.707-0.707j \\ 1 & -1 \\ 1 & -0.707+0.707j \\ 1 & j \\ 1 & 0.707+0.707j \end{bmatrix} \Rightarrow \tilde{F}' = \frac{1}{\sqrt{8}}\begin{bmatrix} 1 & 0.707-0.707j \\ 1 & -j \\ 1 & -0.707-0.707j \\ 1 & -1 \\ 1 & -0.707+0.707j \\ 1 & j \end{bmatrix}$$

The matrix $\tilde{A}$ is then expressed in the following form:

$$\tilde{A} = \frac{1}{\sqrt{8}}\begin{bmatrix} \tilde{B}^1_{diag}\tilde{F}' & \tilde{B}^2_{diag}\tilde{F}' & \tilde{B}^3_{diag}\tilde{F}' \end{bmatrix}$$

FIGS. 4, 5a, 5b and 5c set out simulation results comparing the performance of the known Barhumi technique and the performance of a method of the invention. The simulations relate to a MIMO OFDM system considering a time-selective and frequency-selective BRAN channel E adapted to an external environment type MIMO context, having the characteristics as set out in Table 4 in Appendix B. The frame considered is that described in the Barhumi paper; the set of modulated carriers is divided into two non-contiguous subsets: a set of pilot carriers and a set of payload data.

Figure 4:
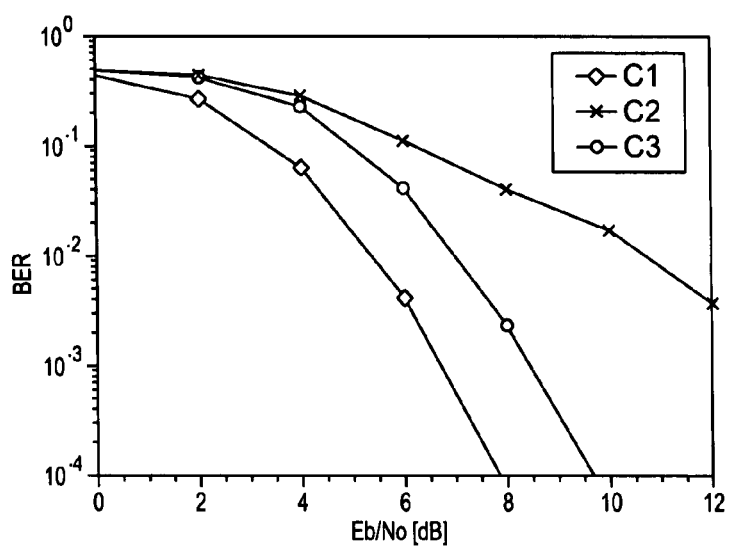
FIG. 4 is a graphical representation of simulation results.

FIG. 4 is a plot of the bit error rate (BER) for 16QAM modulation with a time shift Δt equal to 128. The channel estimation effected at the pilot frequencies is completed by linear interpolation in the time domain to estimate the set of coefficients for the various modulated frequencies. The curve 1, C1, corresponds to a perfect estimate, the curve 2, C2, corresponds to a Barhumi estimate, and the curve 3, C3, corresponds to an estimate in accordance with the invention. Comparing the curves shows that the method of the invention has the advantage of a lower bit error rate than the Barhumi method of the same signal-to-noise ratio and, furthermore, that this difference increases in proportion to the increasing signal-to-noise ratio.

Figure 5A:
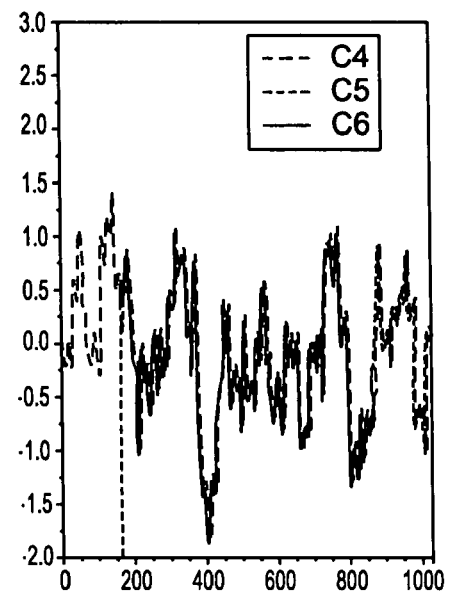
FIGS. 5a, 5b, and 5c are plots of the real part of the coefficient of the channel as a function of the carrier index.
Figure 5B:
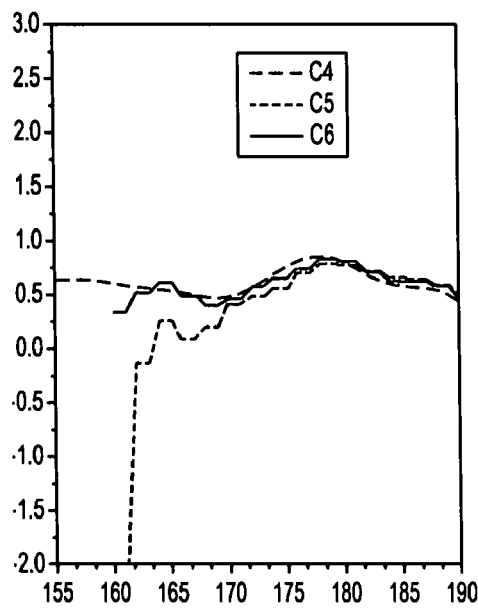
Figure 5C:
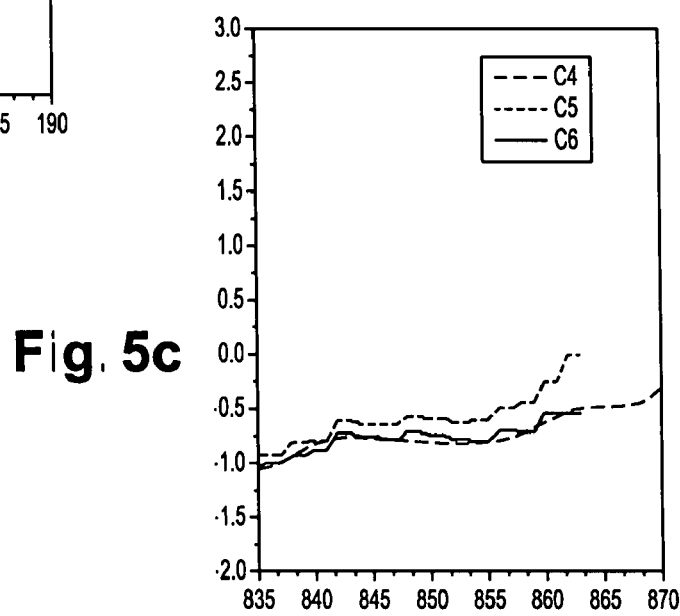

FIG. 5a is a plot of the real part of the coefficient of the channel as a function of the index of the carrier, which varies from 0 to 1023, knowing that the Fourier transform (FFT) has a size of 1024 samples and that the ratio Eb/N0 is equal to 20 dB. FIGS. 5b and 5c zoom in on the FIG. 5a trace around the null carrier indices, respectively at the lower edge of the spectrum (155 to 190) and at the upper edge of the spectrum (835 to 870), knowing that the null carriers correspond to the indices 0 to 159 and 864 to 1023. The curve 1, C4, corresponds to the true values of the coefficients of the channel, the curve 2, C5, corresponds to a Barhumi estimate, and the curve 3, C6, corresponds to an estimate in accordance with the invention. The curve C2 shows significant edge effects near the null carriers at the edges of the spectrum, as previously indicated in the description of the prior art, around the carrier indices 160 and 863. These effects are not observed with a method according to the invention.

APPENDIX A

TABLE 1

| Type de frame used | [Teng] | [Moon], [Larsson], [Baek] | [Barhumi] |
|---|---|---|---|
| Size of FFT window | | 1024 | |
| Number of OFDM symbols in a frame | | 32 | |
| Modulated carriers | | 704 | |
| Payload data | 75% | 84.4% | 88.6% |
| Pilot symbols | 18.75% | 9.4% | 5.1% |
| Other (guard, synch) | | 6.25% | |
| Modulated data | | 22528 | |

APPENDIX B

TABLE 4

| $N_t$ | 2 |
|---|---|
| $N_r$ | 2 |
| Carrier frequency | 5200 MHz |
| Sampling frequency | 50 MHz |
| Space between carriers | 48.828125 kHz |
| Cyclic prefix ratio | 0.211 |
| OFDM symbol time | 24.8 µs |
| Length of convolutional code | 7 |
| Efficiency of code | ½ |
| Channel decoding algorithm | SOVA |
| FFT size | 1024 |
| Number of OFDM symbols per frame | 32 |
| Modulated carriers | 704 |
| Null carriers | 320 |

TABLE 4-continued

| Payload data | 19968 |
|---|---|
| Pilot symbols | 1152 |
| Other (Synch, Guard) | 1408 |
| Data | 22528 |

We claim:

1. A method of estimating transmission channels in a receiver of a multi-antenna system including $N_t$ send antennas, where $N_t$ is greater than or equal to 2, and at least one receive antenna, wherein a time-frequency frame for each send antenna comprises pilot symbols forming a training sequence and data symbols of a payload signal, the $N_t$ training sequences, time-shifted relative to each other, being known to the receiver and enabling the receiver to estimate $N_t$ impulse responses corresponding to the $N_t$ transmission channels between one of the send antennas and the respective receive antenna $RX_j$, the data symbols and the pilot symbols being frequency-modulated by an orthogonal multiplexer to form orthogonal symbols that are sent by the send antennas in the form of a multi-carrier signal with $N_{FFT}$ carriers including $N_p$ pilot carriers and null carriers, the method comprising:

a step of calculating a matrix A constructed in the form of blocks from the training sequences and from a Fourier matrix with dimensions $N_{FFT} \times N_{FFT}$;

wherein for a particular receive antenna $RX_j$, the method comprises a step of calculating the $N_t$ impulse responses in a time domain by multiplying $N_p$ pilot symbols extracted from a frequency-domain signal $R^j(n)$ obtained after demodulation of a time-domain signal received by the particular receive antenna $RX_j$ by means of an FFT of size $N_{FFT}$ by a product of matrices comprising the pseudo-inverse matrix of the product of the Hermitian matrix of the A matrix with the A matrix enabling decorrelation of modulated carriers adjacent null carriers.

2. The method according to claim 1, wherein the calculation of the $N_t$ impulse responses is limited to the $N_p$ pilot carriers.

3. The method according to claim 2, wherein the matrices product is expressed as follows:

$$(A^H A)^+ A^H$$

where $A^H$ is the Hermitian matrix of the matrix A and $^+$ designates the pseudo-inverse matrix.

4. The method according to claim 2, wherein the calculation of the $N_t$ impulse responses is extended to carriers modulated by data by means of interpolation.

5. The method according to claim 1, wherein the step of calculating the $N_t$ impulse responses is repeated for each particular receive antenna of the multi-antenna system.

6. A computer program executing in a receiver, the computer program including program instructions that implement a channel estimate method according to claim 1.

7. A non-transitory information medium containing program instructions adapted to implement a channel estimation method according to claim 1, with said program being loaded into and executed in a receiver.

8. A module for estimating transmission channels in a receiver of a multi-antenna system using $N_t$ send antennas, where $N_t$ is greater than or equal to 2, and at least one receive antenna, wherein a time-frequency frame for each send antenna comprises pilot symbols forming a training sequence and data symbols of a payload signal, the $N_t$ training sequences, time-shifted relative to each other, being known to the receiver and enabling the receiver to estimate $N_t$ impulse responses corresponding to the $N_t$ transmission channels between one of the send antennas and a respective receive antenna $RX_j$, the data symbols and the pilot symbols being frequency-modulated by an orthogonal multiplexer to form orthogonal symbols that are sent by the send antennas in the form of a multi-carrier signal with $N_{FFT}$ carriers including $N_p$ pilot carriers and null carriers, wherein the nodule comprises:

means for calculating a matrix A constructed in the form of blocks from the training sequences and from a Fourier matrix with dimensions $N_{FFT} \times N_{FFT}$; and wherein for a particular receive antenna $RX_j$, the means for calculating Matrix A comprises means for calculating the $N_t$ impulse responses in a time domain by multiplying $N_p$ pilot symbols extracted from a frequency-domain signal $R^j(n)$ obtained after demodulation of a time-domain signal received by the particular receive antenna $RX_j$ by means of an FFT of size $N_{FFT}$ by a product of matrices comprising the pseudo-inverse matrix of the product of the Hermitian matrix of the A matrix with the A matrix enabling decorrelation of modulated carriers adjacent null carriers.

9. A receiver for a multi-antenna system including the transmission channel estimation module according to claim 8.

10. A multi-antenna system including a receiver including the transmission channel estimation module according to claim 8.

* * * * *